Aug. 1, 1939.    E. H. LAND    2,168,220
LAMINATED LIGHT POLARIZER
Filed Aug. 15, 1936
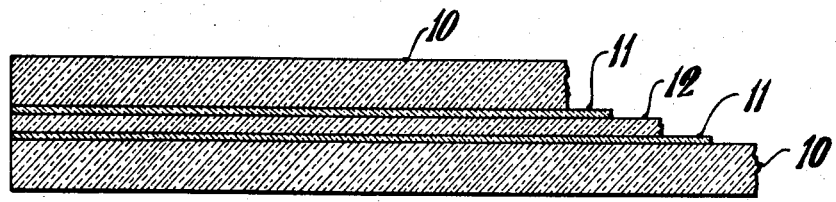
INVENTOR
Edwin H. Land
BY
Brown & Jones
ATTORNEYS Patented Aug. 1, 1939

2,168,220

UNITED STATES PATENT OFFICE 2,168,220

LAMINATED LIGHT POLARIZER

Edwin H. Land, Wellesley Farms, Mass., assignor, by mesne assignments, to Polaroid Corporation, Dover, Del., a corporation of Delaware Application August 15, 1936, Serial No. 96,196

10 Claims. (Cl. 49—92)

This invention relates to a new and improved laminated light-polarizer.

An object of the invention is to provide a light-polarizer in laminated form comprising a sheet-like light-polarizing element having adhesively affixed thereto a plurality of sheets of glass or other protective media.

Another object of the invention is to provide such a light-polarizer wherein the sheet-like light-polarizing element may comprise a set plastic having dispersed and embedded therein a multiplicity of polarizing particles oriented with their polarizing axes in substantial parallelism.

Further objects of the invention are to provide a laminated polarizing element wherein such a set plastic polarizer is adhesively affixed to two sheets of glass by means of an adhesive comprising a substantial amount of plasticizer as compared with the plasticizer in the polarizing plastic; to provide such a lamination wherein a different plasticizer is used in the cement from that employed in the polarizer; to provide such a lamination wherein the index of refraction of the adhesive coincides with that of the set plastic polarizer; and to provide such a lamination wherein the adhesive is a non-solvent of the plastic polarizer.

A still further object of the invention is to provide a laminated polarizer comprising successively a sheet of glass, an adhesive containing a large amount of plasticizing material, a sheet of light-polarizing material comprising a set plastic and a minimum of plasticizing material, a second layer of adhesive comprising a large amount of plasticizing material, and a second sheet of glass.

A still further object of the invention is to provide a laminated light-polarizing element possessing a maximum of shatter-proof properties.

Other objects of the invention will in part be obvious and will in part appear hereinafter.

The invention accordingly comprises the article possessing the features, properties, and the relation of elements which are exemplified in the following detailed disclosure, and the scope of the application of which will be indicated in the claims.

For a fuller understanding of the nature and objects of the invention reference should be had to the accompanyng drawing, which represents in an enlarged and somewhat diagrammatic view a cross-section of a laminated polarizing element embodying the present invention.

The present invention contemplates the production of a laminated light-polarizing material comprising essentially a central layer of light-polarizing material in sheet-like form, two outer layers of glass or other like material, and intermediate layers of adhesive adapted to join permanently the polarizing layer to the outer layers of glass or other material.

The polarizing material employed may comprise a material sold commercially under the trade-name "Polaroid." This material comprises a set plastic medium having embedded therein a mass of polarizing particles such, for example, as particles of herapathite, with their polarizing axes oriented to substantial parallelism. The material possesses certain distinct advantages. It may be obtained in sheet-like form, the sheets are thin, pliable, easily shipped and handled, and they may be cut to any desired size. The material possesses an unlimited angular aperture and is highly efficient as a light-polarizer.

Where Polaroid is employed as the sheet-like polarizing material in the lamination of the present invention, the adhesive should comprise a plasticizer which does not deleteriously affect the crystals of herapathite or which is not a solvent for cellulose acetate, cellulose acetate being the material employed as the transparent suspending medium in Polaroid.

It is to be understood that while Polaroid is a preferred polarizing material, other suitable materials may, if desired, be employed. In every such case, however, the adhesive employed in the present invention should preferably contain a plasticizer which is either inert in the quantities used, with respect to the polarizer, or which is a non-solvent for the polarizer.

Where Polaroid is employed the suitable adhesive may comprise a mixture of a highly polymerized vinyl acetate, such as the material sold commercially as "Vinylite A15," and dibutyl-phthalate, in the proportion approximately of 300 grams of vinyl acetate to 100 c. c. of dibutyl-phthalate. In such a mixture dibutyl-phthalate acts as the plasticizer and is a non-solvent for cellulose acetate. Such a cementitous material may also function as a water-proofing agent.

The mixture of Vinylite and dibutyl-phthalate may preferably be heated to a temperature approximately of 250° F., and may be cooked at that temperature for a period of from two to three hours. It is to be understood, however, that these temperatures and periods of time are not critical, but that the materials should be mixed and heated until they are thoroughly plastic and until all bubbles which may tend to form shall have been driven from the mixture.

When the adhesive mixture has been properly prepared and freed from bubbles, it may be formed into thin sheets or otherwise applied, preferably heated, to two glass sheets. For example, the adhesive mixture may, if desired, be placed in an alemite gun and maintained at a temperature of approximately 212° F. Thereafter suitable quantities of the adhesive may be forced from the gun on to the glass sheets employed in the manufacture of the laminated polarizer. If desired the prepared adhesive mixture may be extruded or otherwise formed into thin sheets, which may be cut to size and placed upon suitable glass sheets.

It is to be understood that the adhesive is preferably applied to two sheets of glass or similar material which, during this stage of the process, may be maintained at a temperature of approximately 212° F. Here again the temperature is by no means critical. It is preferable to work this stage of the process with the materials in heated condition, so that they may be maintained in a fairly plastic condition. If desired, however, the adhesive may be applied cold to the glass and the glass and adhesive then heated.

The sheet-like polarizing material, suitably cleaned, may then be applied to the adhesive on one of the glass plates, and the other plate placed on top of the polarizing sheet and the assembly then placed in any suitable press or other holding mechanism, and subjected to a uniform pressure, preferably in the neighborhood of 150 to 200 pounds per square inch and for a period of from one to two minutes. Here again the pressure employed and the time during which the pressure may be applied are not critical. If a smaller pressure is employed it will be understood that the lamination will be held under the pressure for a somewhat higher period. Throughout the period of pressing it is preferable to maintain the lamination at a temperature, for example, of from 200 to 212° F. The lamination is then removed from the press and the extruded adhesive rolled or cut from around the edges of the lamination. The entire assembly is then suitably cleaned.

In the drawing, 10 represents the glass plates, 11 the layers of adhesive, and 12 the light-polarizing material.

While a mixture of Vinylite and dibutyl-phthalate has been described as the preferred cementing material, it is to be understood that other materials may be employed. For example, other vinyl compounds may be employed, or an acrylic acid ester may be employed as the adhesive with suitable plasticizing media. Even where Vinylite is employed it is to be understood that other plasticizers may be employed, provided, however, that the plasticizer is a non-solvent for the polarizing material in the lamination.

The index of refraction for Polaroid which it is desirable to match with the cement when Polaroid is employed as the light-polarizing material in the lamination of the present invention is approximately 1.482. The index of refraction for the mixture of Vinylite and dibutyl-phthalate already described as suitable for the cementitious material is approximately 1.472. This index is sufficiently close to the index of Polaroid to function satisfactorily in devices embodying the present invention. If it is desired, however, to change the plasticizing material and still to employ Vinylite in the cement, other plastics suitable to the present invention may be diethyl-phthalate or isoamyl-phthalate.

While glass has been described as the medium employed in connection with the lamination of the present invention, it is to be understood that other media may be employed as the outer or protective elements. For example synthetic plastics such as the material sold as "Plexigum," a polymerized acrylic acid ester, or sheet cellulosic compounds, or other similar media may be employed. It is to be understood that where media other than glass are employed it may be desirable to supply a cementitious material which may be plastic at lower temperatures than that of the cement described in connection with the preferred embodiment of the invention above.

It is also to be understood that, if desired, a single layer of adhesive may be employed to affix the polarizing element to a supporting member.

While the process of the present invention has been described as one wherein the cementitious material is first applied to the glass plates employed in connection with the formation of the lamination described, it is to be understood that the process may be modified in many ways without departing from the invention. For example, the cementing material may be applied directly to the light-polarizing sheet and the sheet provided with a coating of cementitious material. Under these circumstances it may be desirable to employ a somewhat harder cement than that described above, for example a cement wherein less plasticizer is employed. Where this modification of the process is employed it is to be understood that the prepared sheets of light-polarizing material employed with the cementitious coating applied thereto may be kept available for lamination with glass or other material over a somewhat extended period.

It is to be understood furthermore that under certain circumstances it may be desirable to employ Canada balsam as the cement. This material is not, however, to be preferred. It is expensive and possesses a distinctive yellowish color. It has the advantage, however, of being harder than the cement described in connection with the preferred embodiment of the invention when cold and somewhat more easily rendered plastic when heated. Canada balsam is, however, not useful where shatter-proof properties are to be desired.

The lamination of the preferred embodiment of the invention described above possesses very excellent shatter-proof properties, i. e., shatter-proof in the sense used in the automotive windshield industry. Polaroid, which is ordinarily employed as the preferred light-polarizing material, usually contains very little plasticizer and hence possesses great tensile strength. The cement material described above maintains a very fine bond between the light-polarizing material and the glass over a wide range of temperature variations.

Where desired the product of the present invention may be produced in relatively thin form. For example, the glass or other material employed as the cover plates need only be thick enough to resist breakage under the pressures employed in the preparation of the lamination. The light-polarizing sheet need be no thicker than, for example, .005 of an inch, and the layers of adhesive may be even thinner.

Since certain changes may be made in the above product and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A lamination comprising a plurality of transparent elements having sandwiched therebetween and bonded thereto a sheet-like light-polarizing body comprising a set suspending medium having a mass of oriented polarizing particles embedded therein, the lamination also comprising bonding material having a substantially higher plasticizer content than said set suspending medium and being substantially inert with respect to said light-polarizing body.

2. A lamination comprising a plurality of transparent elements having sandwiched therebetween and bonded thereto a sheetlike light-polarizing body comprising a set suspending medium having a mass of oriented polarizing particles embedded therein, the lamination also comprising bonding material, said material being substantially inert with respect to said light-polarizing body and having an index of refraction coinciding substantially with that of said set suspending medium.

3. A lamination comprising a plurality of transparent elements having sandwiched therebetween a sheetlike light-polarizing body comprising a set suspending medium having a mass of oriented polarizing particles embedded therein, and means for cementing said light-polarizing body to said transparent elements, said means comprising a vinyl compound having a substantially higher plasticizer content than said set suspending medium.

4. A sheet of light-polarizing material having each of its faces coated with a substantially water-proof, transparent cement having substantially the same index of refraction as said sheet.

5. A shatter-proof, light-polarizing lamination comprising a plurality of sheets of glass, a sheet of light-polarizing material comprising a set plastic material and a minimum amount of plasticizer, and a cement for uniting said sheets comprising a plastic and a relatively large amount of plasticizer.

6. A shatter-proof, light-polarizing lamination comprising a plurality of sheets of glass, a sheet of light-polarizing material comprising a set plastic material and a minimum amount of plasticizer, and a cement for uniting said sheets comprising a vinyl compound and a relatively large amount of plasticizer.

7. In combination, a glass sheet, an adhesive layer comprising a highly polymerized vinyl compound and a relatively large amount of plasticizer, a light-polarizing layer comprising a set suspension of oriented polarizing particles in a cellulosic medium comprising a relatively small amount of plasticizer, a second adhesive layer and a second glass sheet, the plasticizer in said adhesive being a non-solvent of said cellulosic medium and of said polarizing particles.

8. A lamination comprising a plurality of transparent elements having sandwiched therebetween and bonded thereto a sheet of plastic having a relatively low plasticizer content, the lamination also comprising bonding material having a substantially higher plasticizer content than said plastic.

9. A lamination comprising a sheet of glass, an adhesive having a relatively high plasticizer content; a sheet of transparent plastic having a relatively low plasticizer content, an adhesive having a relatively high plasticizer content, and a second sheet of glass, the adhesive layers bonding the plastic to the sheets of glass.

10. A laminated plate of non-glare safety glass comprising a pair of glass sheets, a layer of plasticized polymerized vinyl resin adherent to the inner face of each glass sheet, and a relatively thin sheet of hard cellulosic material intermediate the vinyl resin layers and adhered thereto, the cellulosic material having dispersed and embedded therein a multiplicity of light-polarizing particles with their polarizing axes oriented to substantial parallelism, the sheet of cellulosic material having relatively little plasticizer as compared with the layers of vinyl resin.

EDWIN H. LAND.